United States Patent [19]
Bridgstock et al.

[11] Patent Number: 4,795,877
[45] Date of Patent: Jan. 3, 1989

[54] FAULT DETECTING DEVICE FOR WELDED PIPE JOINTS

[75] Inventors: Eric Bridgstock, Hope; Brian Glaves, Sheffield; David M. A. Kenworthy, Barnsley; David A. Bilton, Chesterfield, all of England

[73] Assignees: Fusion Plastics Limited, Chesterfield; Vecstar Limited, Sheffield, both of England

[21] Appl. No.: 905,500

[22] Filed: Sep. 10, 1986

[30] Foreign Application Priority Data

Sep. 12, 1985 [GB] United Kingdom ............... 8522633

[51] Int. Cl.$^4$ .............................................. H05B 1/02
[52] U.S. Cl. .................................. 219/109; 219/110; 219/497; 219/506; 219/505; 219/535; 156/274.2; 156/379.7; 264/272.11; 285/286
[58] Field of Search ............... 219/109, 110, 505, 504, 219/497, 494, 499, 506, 535, 522, 528, 541; 156/273.9, 86, 272.2, 274.2, 364.2, 379.6, 379.7; 264/272.11–272.19; 285/21, 22, 286, 292, 369, 423; 425/393

[56] References Cited
U.S. PATENT DOCUMENTS 3,564,204  2/1971  Mense ................................. 219/497
4,416,713  11/1983  Brooks ................................. 219/497
4,421,976  12/1983  Jurek .................................... 219/497
4,642,154  2/1987  Thalman et al. ..................... 219/497
4,642,155  2/1987  Ramsey ................................ 219/497

Primary Examiner—M. H. Paschall
Attorney, Agent, or Firm—Watson, Cole, Grindle & Watson

[57] ABSTRACT

In an electron-fushion welding process a fault, e.g. due to incorrect assembly of the pipe joint components, is detected by sensing the welding current and emitting a signal to actuate an audible or visible alarm and/or to interrupt the welding process, if the welding current increases unexpectedly. A reference signal dependent upon the current dependent signal produced by the sensor and RMS to DC converter at a time $t_1$ is held by a converter and is compared by a comparator with the current dependent signal transmitted through converter at subsequent intervals. So that the device does not react to transient current increase a delay arrangement delays the output signal for a given time.

17 Claims, 3 Drawing Sheets

FAULT DETECTING DEVICE FOR WELDED PIPE JOINTS

BACKGROUND OF THE INVENTION

1. Field of the Invention

This invention relates to a method of and a device for detecting a fault when making welded joints in thermoplastic pipe using so-called electro-fusion fittings.

An electro-fusion fitting generally comprises a body of thermoplastic material having an electrical resistance heating element disposed adjacent a surface of the body and to which an electric current may be supplied to fuse the material of the body to that of a pipe. The fittings are frequently used in the production of joints between lengths of thermoplastic pipe, such as polyethylene pipe which is used in the gas industry. A fitting for joining two pipes end-to-end usually comprises a sleeve or muff incorporating a coil of resistance heating wire adjacent its inner surface. The ends of the pipes to be connected are pushed into the sleeve, the heating coil is connected to a suitable power supply and an electric current is supplied to the coil for a controlled period to soften and fuse the material of the fitting and pipes so that they become firmly welded together.

Pipe joints obtained by use of electro-fusion fittings are generally satisfactory, but the weld strength achieved depends upon the correct level of electric current being supplied for the correct amount of time, and these factors differ for fittings of different sizes and types.

2. Prior Art

In EP-A No. 0076043 there is described a control system which sets automatically the correct time for which current is supplied to a fitting, whereby the manufacture of satisfactory joints is simplified. The standard of joint obtained is also dependent upon the pipes and sleeve being correctly assembled together before delivering the current to the heating coil. Thus, if the pipe ends are: (i) too far apart; (ii) not centred within the sleeve; (iii) not square to each other; or (iv) misaligned, a faulty joint can result and may not be detectable by visual inspection of the completed joint. When the pipes and sleeve are correctly assembled the flow of molten material is small during the welding process, but if they are not properly assembled the flow can be fairly substantial leading to adjacent turns of the heating coil becoming pushed together and shorting. As a consequent over-heating may occur and in extreme cases the current may rise to such a level that the wire may melt and break, possibly causing a spark which can be highly dangerous if gas is present. The present invention is based on the realisation that an unexpected rise in the electric current flowing in the heating coil is indicative of improper conditions during the welding process.

SUMMARY OF THE INVENTION

Thus, according to one aspect of the present invention there is provided a method of detecting a fault in an electro-fusion welding process, comprising the steps of sensing the welding current flowing through an electrofusion fitting and generating a signal dependent upon the current sensed, monitoring said current dependent signal and producing a fault indicative output signal in response to a change in the current dependent signal due to an increase in the welding current, after a short initial welding period during which the welding current should reach a maximum for the welding process.

The output signal can be relied upon e.g. to actuate an alarm and/or to interrupt the current supply to the fitting, if the current level rises unexpectedly during the welding process.

In accordance with a second aspect the invention provides a device for detecting a fault during an electrofusion welding process, comprising means for sensing the welding current flowing through an electrofusion fitting and producing a signal dependent on the current sensed, and means coupled to receive the current dependent signal for monitoring said signal and producing a fault indicative output signal if, after a short initial period during which the welding current should reach a maximum, the current dependent signal changes in accordance with the welding current having increased.

In the preferred embodiment the current dependent signal is compared with a reference signal. In particular, the means coupled to the sensing means is arranged to sample and hold the current level at a first time $t_1$, and to sample the current level at subsequent intervals and compare the current level with the reference level taken at time $t_1$. It is expedient for the reference current level to be taken when the current should have reached a relatively stable condition after an initial period.

BRIEF DESCRIPTION OF THE DRAWINGS

A better understanding of the invention will be had from the following detailed description in which reference is made to the accompanying drawings, in which:

FIGS. 3b and 3c illustrate the outputs produced by respective stages of the fault detecting device in response to the current vs time characteristic shown in FIG. 3a.

DETAILED DESCRIPTION

Figure 1:
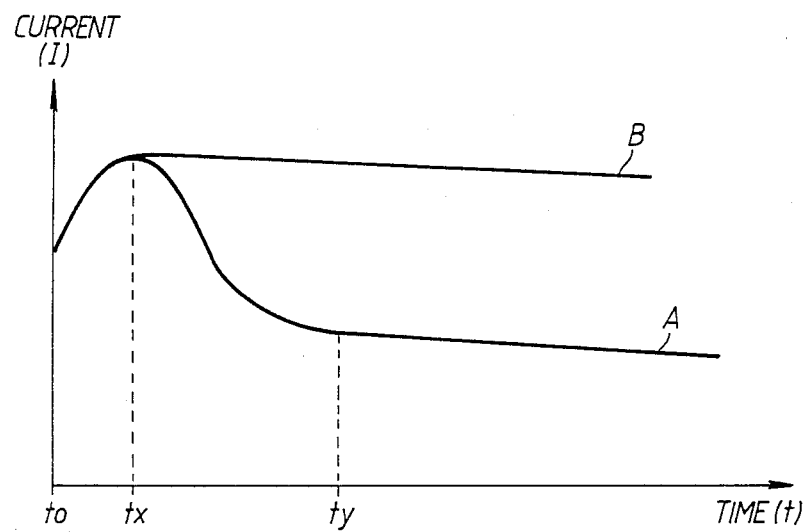
FIG. 1 is a graph of electric current plotted against time and showing typical characteristic curves for the heating coils of electro-fusion fittings.

Most electro-fusion fittings manufactured and sold at present have heating coils either of plain copper or alloy, and have either a small or a distinct positive temperature coefficient. In FIG. 1 the characteristic curve obtained with a copper wire under normal conditions is indicated by the letter A, and that for a composite alloy wire is indicated by the letter B. In both cases there is a sharp rise in current when the fitting is first connected to the power supply, the current reaching a maximum at time tx. The current then falls off gradually as the temperature rises, in the case of the alloy wire, whereas with the copper wire the current drops rapidly from the maximum as the wire heats up, but after a time ty the current falls more slowly because heat is then being transferred to the plastic material of the electro-fusion fitting and the temperature is more stable. The fault detecting device of the invention is designed so that it can function with fittings with heating coils of either kind, as will become clear. The device is also suitable for different size of fittings. Typical values for large and small fittings are as follows:

| Large fittings (180 mm sleeve) | tx = | 1 sec. |
| --- | --- | --- |
| | ty = | 30 sec. |
| time during which welding current supplied | = | 500 sec. |
| Small fitting (20 mm sleeve) | tx = | 0.3 sec. |
| | ty = | 7 sec. |
| time during which welding current supplied | = | 25 sec. |

Figure 2:
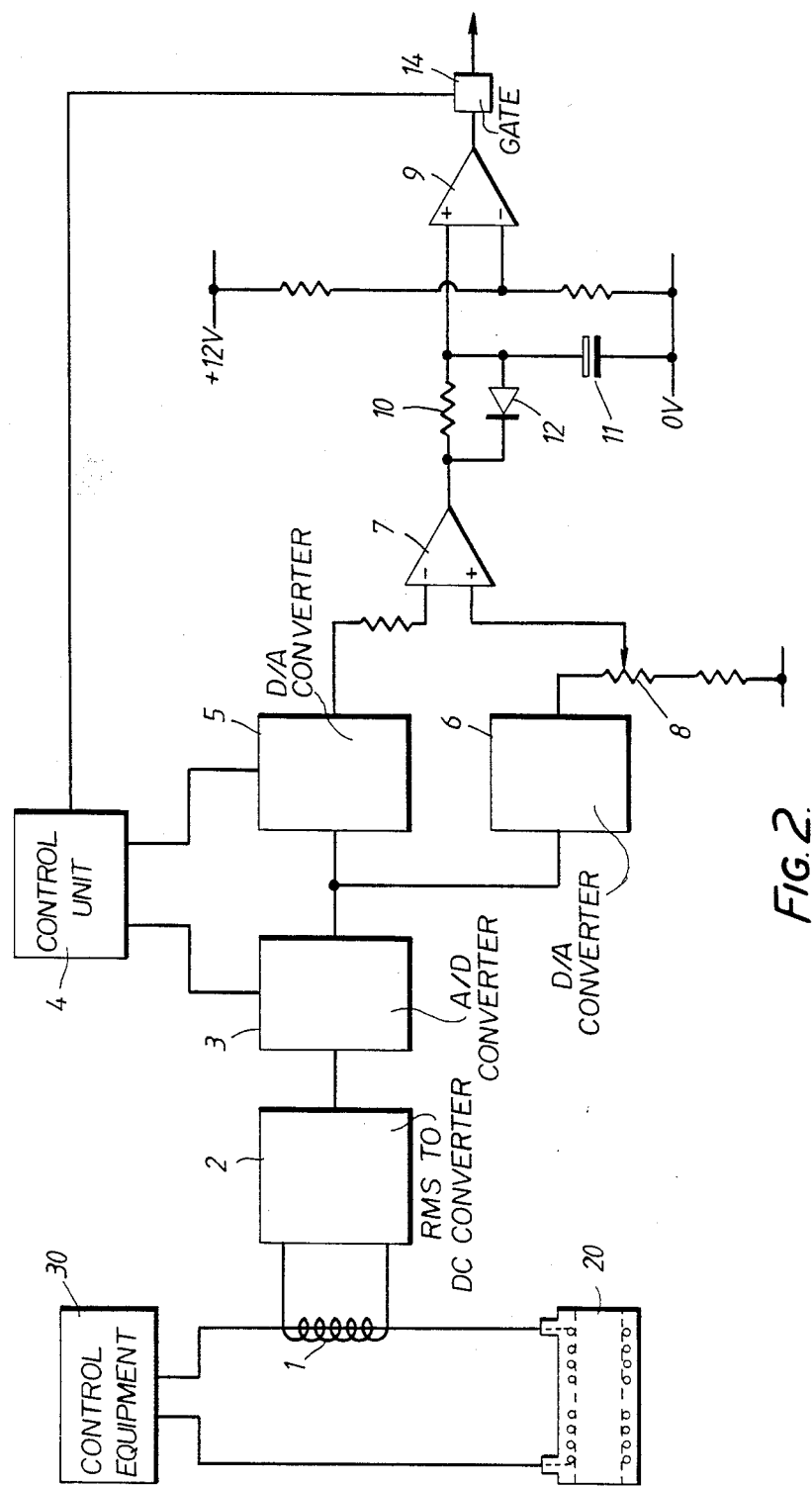
FIG. 2 is a circuit diagram for a fault detecting device embodying the invention.

With specific reference now being made to FIG. 2, the illustrated embodiment of the invention includes a current transformer 1 for sensing the electric current 1 being supplied to an electro-fusion fitting 20 from control equipment 30 which may be as described in the above mentioned European patent specification EP-A No. 0076043. The output from the transformer 1, e.g. about 10 volts for maximum current of, say, 50 amps to the fitting 20, is fed to an RMS to DC converter 2 which provides an output signal proportional to the fitting current, e.g. a nominal 1.5 volts at 50 amps fitting current. The RMS current is a direct measure of heat input and has the advantage of being unaffected by the input voltage to the system, waveform distortion and other external influences. The converter 2 is connected to an analogue to digital converter 3 which has a control input connected to a control unit 4. In response to a pulse received at the control input, the converter 3 takes the signal from converter 2 and emits a corresponding output in digital form, such as an eight bit code. The unit 4 provides a regular train of control pulses to the converter 3, e.g. at a rate of 1 per second. The digital output of the converter 3 is supplied to a first digital to analogue converter 5 and a second digital to analogue converter 6. The first converter 5 also has a control input connected to the control unit and on receipt of a control pulse at this input emits an output corresponding to the digital input signal from the converter 3, this output being held until the next control pulse is received from the control unit. The second converter 6 produces an output which corresponds to and follows the digital input received from the converter 3. The output of converter 5 is connected to a first (−) input of a comparator 7, and the output of converter 6 is connected to the second (+) input of the comparator 7, through a variable resistance 8. The comparator 7 produces an output signal only when the signal at the (+) input exceeds that at the (−) input. The variable resistor 8 is set so that the signals received at the respective inputs of the comparator 7 are the same when the output from converter 6 is a given percentage, e.g. 10%, greater than that emitted by converter 5.

So that the device does not respond to short lived or transient current increases, the output of the comparator 7 is fed to a second comparator 9 through a delay arrangement. The first (−) input of comparator 9 is supplied with a constant signal set by a potential divider. The delay arrangement comprises a resistor 10 and a capacitor 11 connected in series between the output of the comparator 7 and ground, the common point between the resistor and capacitor being connected to the second input (+) input of the comparator 9, and a diode 12 being connected in parallel with the resistor. An output from the comparator 7 charges the capacitor, the value of which is selected so that the output must be present for at least a given time, preferably about 4 seconds, before the signal received at the (+) input of the comparator 9 exceeds that received at the (−) input so that this comparator also produces an output. If the output from comparator 7 ceases before the given delay period has elapsed, the capacitor 11 discharges through the diode 12 and no signal is emitted from comparator 9. The signal from comparator 9 is delivered through a gate 14 controlled by the control unit 4 and may be used to actuate audible and/or or visual alarms or to interrupt the welding process by cutting off the delivery of current to the fitting 20.

The control unit is arranged so that initially, at $t_o$, the gate 14 is open. At time $t_1$, e.g. a delay of 10 secs from $t_o$, the gate 14 is closed and a control pulse is emitted to the converter 5 so that it will produce an output corresponding to the fitting current at that time. It will be appreciated that $t_1$ is chosen so that it exceeds the maximum current time tx for all fittings with which the device is to be used. The instantaneous current through the fitting 20 is sensed each second in accordance with the train of control pulses to converter 3 and if the current falls, as is to be expected from the curves shown in FIG. 1, the output from converter 6 never reaches a level sufficient to switch the comparator 7. Thus, no fault signal is emitted.

The inclusion of the gate 14 avoids any spurious fault signal being generated before the time $t_1$ has been reached.

As mentioned above, the relatively stable current condition for large fittings need not be reached for a time $t_y$ of about 30 secs (which is greater than the welding period for small fittings). So that the reference current sampled and held by the converter 5 is not set too high, which would mean the device might not respond to a subsequent rise in current after $t_y$, a second control pulse is emitted to the converter 5 at $t_2$ which is for example 20 seconds after $t_1$. Thus, converter 5 then resamples and holds the current level at $t_2$ which is around $t_y$ for large fittings and the device will respond to increases in current above this new, lower reference current.

Figure 3A:
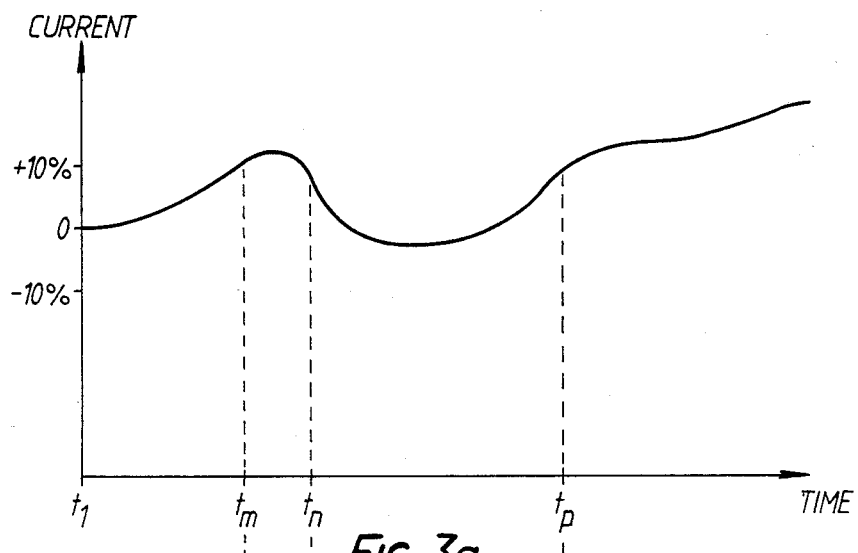
FIG. 3a is a graph showing electric current plotted against time for a faulty pipe joint.
Figure 3B:
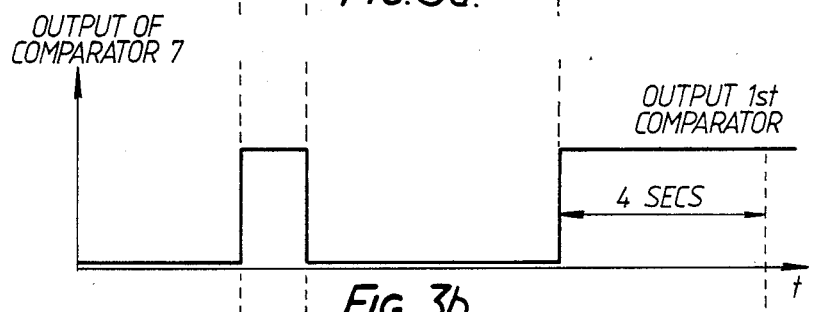
Figure 3C:
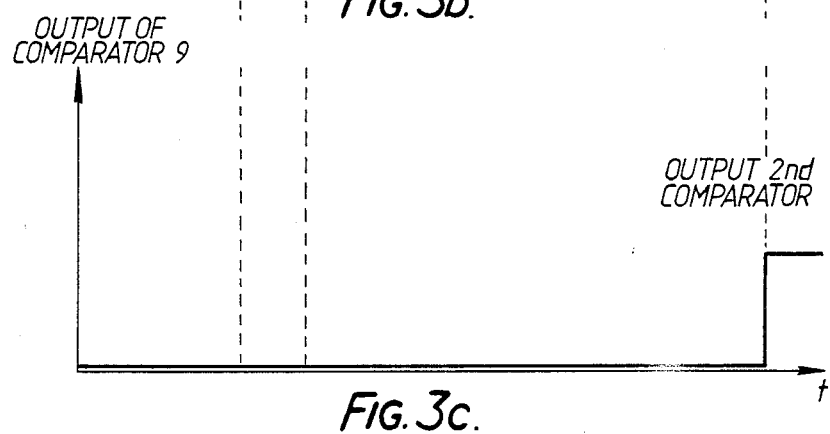

The operation of the device for a typical faulty joint will now be described. FIG. 3a shows the fitting current rising after time $t_1$ and then falling below the current at $t_1$ before rising again. The converter 5 holds the current level at time $t_1$. At $t_m$ the current has risen above the $t_1$ level by 10%, whereby the comparator 7 switches and starts to charge the capacitor 11. Then at $t_n$, before the capacitor has become fully charged the current falls below the $t_1$ level +10% so the comparator 7 is turned off and the capacitor discharges through the diode 12. The output from the comparator 7 is shown in FIG. 3b. At time $t_p$ the current again exceeds the trigger level and the comparator 7 switches on and once more starts to charge up the capacitor 11. After the predetermined delay, which is 4 secs in the described embodiment, the comparator 9 switches on and emits a fault signal which is used to generate an alarm and/or to interrupt the current supply to the fitting 20. The output from comparator 9 is shown in FIG. 3c.

By measuring the fitting current and comparing it with the reference current supplied to the same fitting at an earlier stage in the welding process problems associated with a fixed level system are avoided. Each time a joint is made a new reference level and corresponding trigger level are established, thus eliminating errors due to manufacturing tolerances in the coil resistance and variations in ambient temperature.

It will be appreciated that the above described embodiment of the invention could be modified so that the reference current signal held by the converter 5 is reset two or more time during the welding process.

In a modified fault detecting device embodying the invention, the components 5-14 of the device shown in FIG. 2 are omitted and the output from the convertor 3 is fed to a microprocessor control unit which replaces the control unit 4, and which includes a memory for storing the sampled current dependent signal, and a counter. After an initial delay during which the welding current should have reached its peak value, the welding current dependent signal is sampled at given time intervals, e.g. once every second, and is compared with a reference signal which is the immediately preceding sampled current dependent signal stored in the memory. If the sampled signal exceeds the reference signal a pulse is produced to increase the count of the counter by one, and if the sampled signal is less than the reference signal a pulse is produced to reduce the count by one. The fault indicating output signal is emitted in response to the count of the counter reaching a given number, e.g. 4. Typical values for the current dependent signal and the count of the counter for a welding current following the curve of FIG. 3a are given by the following table:

| Sample/Time | 1 | 2 | 3 | 4 | 5 | 6 | 7 | 8 | 9 | 10 | 11 | 12 |
|---|---|---|---|---|---|---|---|---|---|---|---|---|
| Current Signal Value | 5 | 5 | 6 | 6 | 7 | ·6 | 5 | 4 | 5 | 6 | 7 | 8 |
| Count | 0 | 0 | 1 | 1 | 2 | 1 | 0 | 0 | 1 | 2 | 3 | 4 ↓ (Fault Signal) |

What we claim is:

1. A method of detecting a fault in an electrofusion welding process, comprising the steps of sensing the welding current flowing through an electrofusion fitting and generating a signal dependent upon the current sensed, monitoring said current-dependent signal and producing a fault indicative output signal in response to a change in the current-dependent signal due to an increase in the welding current, after a short initial welding period during which the welding current should reach a maximum for the welding process, said current dependent signal being compared with a set reference signal corresponding to a current-dependent signal representative of a welding current higher than expected after said initial period, and said output signal being produced if the current dependent signal becomes greater than said reference signal.

2. A method according to claim 1, wherein said reference signal is set to be equivalent to the current dependent signal at the end of said initial period.

3. A method according to claim 2, wherein during the welding process the reference signal is reset to be equivalent to the current dependent signal after a further time period following and of longer duration than said initial period.

4. A method according to claim 1, wherein the output signal is delayed for a short period after a fault condition has been detected to prevent the fault indicating output signal being emitted if the welding current after increasing diminishes again during said delay period.

5. A device for detecting a fault during an electrofusion welding process, comprising means for sensing the welding current flowing through an electro fusion fitting and producing a signal dependent upon the current sensed, means coupled to receive the current-dependent signal for monitoring said signal and producing a fault-indicative output signal if, after a short initial period during which the welding current should reach a maximum, the current-dependent signal changes in accordance with the welding current having increased, said monitoring means comprising means for producing a reference signal, means arranged to compare said current-dependent signal received from the sensing means with said reference signal, said reference signal means receiving the currentdependent signal produced by the sensing means at the end of said initial period and producing said reference signal in accordance with said current-dependent signal, and means for actuating the reference signal means to reset the reference signal to a value corresponding with the current-dependent signal at the end of a further period of time following and of longer duration than said initial period.

6. A device according to claim 5, wherein the current sensing means is arranged for sensing the RMS current.

7. A device according to claim 5, wherein the current sensing means comprises converter means for producing a voltage signal proportional to the welding current.

8. A device according to claim 6, wherein the monitoring means includes means for so adjusting the reference and current dependent signals that the comparing means emits a signal indicating a fault only when the current dependent signal represents a welding current in the order of 10% higher than the welding current represented by the reference signal.

9. A device according to claim 5, wherein the monitoring means includes signal delaying means for delaying the fault indicating output signal for a given time and suppressing said signal if the welding current decreases again within said given time.

10. A device according to claim 5, wherein gate means is connected to the monitoring means for blocking any fault indicating output signal produced during said initial period.

11. A device for detecting a fault during an electrofusion welding process, comprising means for sensing the welding current flowing through an electrofusion fitting and producing a signal dependent upon the current sensed, means coupled to receive the current-dependent signal for monitoring said signal and producing a fault-indicative output signal if, after a short initial period during which the welding current should reach a maximum, the current-dependent signal changes in accordance with the welding current having increased, said monitoring means comprising means for producing a reference signal, means arranged to compare said current-dependent signal received from the sensing means with said reference signal, said monitoring means comprising means for comparing the current-dependent signal received from the sensing means with a set reference signal, sampling means connected to the sensing means for sampling the current-dependent signal at predetermined time intervals, comparing means for comparing subsequent sample signals with a first sample signal, a control unit, the sampling means comprising a first converter having a control input connected to receive a train of control pulses emitted by the control unit, the conveyor being connected to the sensing means for receiving the current-dependent signal and emitting at an output thereof a signal corresponding to the current-dependent signal at the time of receiving the immediately preceding control pulse, and the comparing means comprises a comparator with two inputs, a pair of second converters each having an input connected to the output of the first converter and an output coupled to a respective input of the comparator, one of said second converters having a control input connected to the control unit and producing at the output thereof a signal corresponding to the signal received at the input thereof at the time of receiving the immediately preceding pulse at the control input, and the other of said second converters producing at the output thereof a signal corresponding to that being received at the input thereof.

12. A device according to claim 11, wherein the monitoring means includes signal delaying means for delaying the fault-indicating output signal for a given time and suppressing said signal if the welding current decreases again within said given time.

13. A device according to claim 11, wherein gate means is connected to the monitoring means for blocking any fault-indicating output signal produced during said initial period.

14. A method of detecting a fault in an electrofusion welding process, comprising the steps of sensing the welding current flowing through an electrofusion fitting and generating a signal dependent upon the current sensed, monitoring said current-dependent signal and producing a fault indicative output signal in response to a change in the current-dependent signal due to an increase in the welding current, after a short initial welding period during which the welding current should reach a maximum for the welding process, said current dependent signal being sampled at predetermined time intervals, and each sample signal being compared with a reference signal corresponding to the immediately preceding sampled signal.

15. A method according to claim 14, wherein the count of a counter is increased in response to a sampled signal exceeding the reference signal and is decreased in response to a sampled signal being lower than the reference signal, and the fault indicating output signal is generated in response to the counter reaching a given count.

16. A device for detecting a fault during an electrofusion welding process, comprising means for sensing the welding current flowing through an electro-fusion fitting and producing a signal dependent upon the current sensed, means coupled to receive the current-dependent signal for monitoring said signal and producing a fault-indicative output signal if, after a short initial period during which the welding current should reach a maximum, the current-dependent signal changes in accordance with the welding current having increased, the signal monitoring means comprising sampling means connected to the sensing means for sampling the current-dependent signal at predetermined time intervals, memory means for storing a sampled signal, comparing means for comparing a sampled signal with a preceding sampled signal stored in the memory means and producing an output signal in response to a sampled signal exceeding the preceding sampled signal, and means for receiving the output signal from the comparing means and for generating the fault indicative output signal.

17. A device according to claim 16, wherein the means for receiving the output signal of the comparing means includes a counter, the comparing means producing a signal to increase the count of the counter in response to a sampled signal exceeding the said preceding sampled signal and to decrease the count of the counter in response to a sampled signal being lower than the said preceding sampled journal, and means for emitting the fault indicative output signal in response to the count of the counter reaching a predetermined level.

* * * * *